United States Patent Office 3,361,666
Patented Jan. 2, 1968

3,361,666
INORGANIC SOLID FILM LUBRICANTS
James E. Webb, administrator of the National Aeronautics and Space Administration, with respect to an invention of Donald H. Gaddis, Prairie Village, and Vernice Hopkins, Overland Park, Kans.
No Drawing. Filed Sept. 9, 1966, Ser. No. 578,923
6 Claims. (Cl. 252—26)

ABSTRACT OF THE DISCLOSURE

Inorganic solid film lubricants having the following composition, in weight percent of total dry solids: molybdenum disulfide, 34 to 50; graphite, 4 to 5; aluminum phosphate, 15 to 20; and either gold, 20 to 25; or bismuth, 40 to 47. The aluminum phosphate serves as binder, and the remaining components are finely divided lubricating solids dispersed in the binder. These lubricants exhibit stability under space environmental conditions and a long wear life.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to lubricants and more particularly to inorganic solid film lubricants for use in space environments.

One of the requirements for successful operation of mechanical devices with moving parts in space applications is the provision of a suitable lubricant. The lubricant should be able to withstand a wide range of temperatures and pressures from atmospheric down to below $10^{-10}$ torr. It should also be stable in the presence of moisture, liquid oxygen and rocket fuels. In addition to these environmental requirements the lubricant must have effective lubricating characteristics, in particular, a low coefficient of friction and a long wear life.

Conventional organic lubricants fail rapidly in the high vacuum of space because of volatilization of organic components. This difficulty has been avoided by the use of inorganic solid film lubricants comprising various combinations of lubricating materials dispersed in an inorganic binder. These compositions are applied and bonded to the mating surfaces as a thin solid film. The binder usually forms a matrix and holds the lubricant particles in many tiny reservoirs. One previously known composition of this type employs molybdenum disulfide, graphite and gold as lubricating materials and sodium silicate as the binder. This composition presents disadvantages in that the sodium silicate is unstable in the presence of moisture, and the wear life is shortened by disruption of the film. Improved moisture resistance has been obtained by using potassium silicate, either by itself or modified with sodium fluoride, as the binder in place of sodium silicate, but the wear life is still too short for many applications. A more effective binder material is thus needed to obtain a longer wear life, consistent with other favorable characteristics.

It is therefore an object of this invention to provide an inorganic solid film lubricant composition suitable for use in space environments.

Another object is to provide an improved binder for solid film lubricant compositions.

Another object is to provide a solid film lubricant composition having a longer wear life.

Other objects and advantages of the invention will be apparent from the following description.

In the present invention aluminum phosphate is used as the binder for inorganic solid film lubricants. Compositions comprising combinations of powdered lubricating materials in an aluminum phosphate binder are stable under space environmental conditions and they show a substantially longer wear life than previous compositions.

Effective lubricating properties are obtained by using 15 to 20 weight percent (based on total dry solids) aluminum phosphate, the balance of the composition being powdered lubricating solids. At higher proportions of aluminum phosphate the coefficient of friction is unduly increased, and at lower proportions wear life is decreased.

Any of the previously known powdered lubricants which are compatible with aluminum phosphate can be used as the lubricating component of the composition within the scope of this invention. However, the preferred compositions employ as the lubricating component a major proportion of molybdenum disulfide, a minor proportion of graphite and a major proportion of either gold or bismuth.

Molybdenum disulfide exhibits a low coefficient of friction, along with other favorable properties, and is thus suitable as a major component. 34 to 50 weight percent of this component can be used. A minor proportion of graphite serves to decrease the initial friction. 4 to 5 weight percent graphite can be used. The remaining lubricating ingredient can either be gold at a proportion of 20 to 25 weight percent or bismuth at a proportion of 40 to 47 weight percent. Gold and bismuth are essentially equivalent in that either of them serves to impart increased thermal conductivity and flexibility to the composition. Two compositions which have been found particularly effective are as follows, in weight percent of total dry solids: Composition No. 1, molybdenum disulfide, 50; graphite, 5; aluminum phosphate, 20; and gold, 25; and Composition No. 2, molybdenum disulfide, 34; graphite, 4; aluminum phosphate, 15; and bismuth, 47.

Other lubricating materials which can be used in combination with the aluminum phosphate binder include finely divided $TaS_2$, $WS_2$, $WSe_2$, $MoSe_2$, $TaSe_2$, $ReS_2$ and $ReSe_2$.

The lubricant compositions of the present invention are readily prepared by mixing the lubricating materials in finely divided form in an aqueous aluminum phosphate solution. Although not critical, an aluminum phosphate concentration of about 50 weight percent in the solution is preferred. The lubricating components must be finely divided to be effective, and a particle size smaller than —325 mesh size is suitable for these components.

The aqueous slurry obtained by mixing all of the components is applied to the mating surface to be lubricated to obtain a film of the desired thickness. Bonding of the film to the surface is effected by heating to a temperature of about 300 to 400° F. for a period of at least 4 hours. This treatment also serves to remove substantially all of the water. The film thickness can be varied within the range of about .0002 to .0015 inch, depending on the requirements for the particular application. In general, high loads on the mating surfaces do not necessitate a thicker film since this film exhibits a low coefficient of friction and thus a higher effectiveness at higher applied pressures than at lower pressures.

This invention is illustrated by the following example. In this example proportions of ingredients are in weight percent of total dry solids, unless otherwise indicated.

EXAMPLE

Wear life runs were conducted using the compositions described above as composition numbers 1 and 2 and a previously known composition similar to composition number 1 except that the binder was sodium silicate. The latter composition comprised molybdenum disulfide, 51; graphite, 5; gold, 26; and sodium silicate, 18. In each case the composition was prepared by mixing the lubricating materials in finely divided (325 mesh size)

form in a solution containing 50 weight percent of the binder dissolved therein. The compositions were each applied to the surface of pellets in a wear testing device and were bonded to the surface by heating to 300° F. A cured film thickness of 0.0008 to 0.0012 inch was used in each case. The wear tester comprised three flat-end pellets rigidly mounted in a holder, the holder being adapted to rotate with the flat pellet ends contacting a wear track plate. The plate was 440C stainless steel hardened to 55 to 59 Rockwell C hardness, and its surface roughness was 4 to 6 microinches. In each case the pellet holder was driven at 900 revolutions per minute (765 feet per minute rubbing speed) and was loaded to 300 grams per contact (13.5 pounds per square inch projected area). A dry nitrogen atmosphere was used in each run. The tester was provided with a high-friction shutoff switch so that the run would be terminated when the coefficient of friction reached 0.30, the starting coefficient for these compositions being about 0.15. The test temperature was 75 to 90° F. The results obtained may be seen by reference to the following table.

SUMMARY OF WEAR-LIFE DATA

| Lubricant Composition | No. of Runs | Average Wear-Life, hrs. | 95% Confident Limit | |
|---|---|---|---|---|
| | | | Lower (hr.) | Upper (hr.) |
| No. 1 | 21 | 44.7 | 35.3 | 56.6 |
| No. 2 | 12 | 60.5 | 41.3 | 88.7 |
| No. 3 | 21 | 24.2 | 19.3 | 30.2 |

It may be seen that the compositions (Nos. 1 and 2) having an aluminum phosphate binder showed a substantially longer wear life than the composition having the sodium silicate binder.

The above example is merely illustrative and is not to be understood as limiting the scope of the invention, which is limited only as indicated by the appended claims.

The lubricant compositions of the present invention are broadly useful for lubricating bearings, actuators and other sliding or rubbing surfaces for service in space environments and are likewise useful for non-space applications under less demanding environments. These compositions are compatible with the metals normally used for applications wherein lubrication is required. For example, stainless steel, aluminum and tool steels can be lubricated by this means.

What is claimed is:
1. A solid film lubricant composition comprising, in weight percent of total dry solids,

| | |
|---|---|
| Molybdenum disulfide | 34 to 50 |
| Graphite | 4 to 5 |
| Aluminum phosphate | 15 to 20 |
| And either gold | 20 to 25 |
| or | |
| Bismuth | 40 to 47 |

2. A solid film lubricant composition consisting essentially of an aluminum phosphate binder at a proportion of 15 to 20 weight percent total dry solids and having dispersed therein in finely divided form 34 to 50 weight percent molybdenum disulfide, 4 to 5 weight percent graphite and either 20 to 25 weight percent gold or 40 to 47 weight percent bismuth.

3. The composition of claim 2 wherein the amounts of aluminum phosphate, molybdenum disulfide, graphite and gold in weight percent of total dry solids are 20, 50, 5 and 25, respectively.

4. The composition of claim 2 wherein the amounts of aluminum phosphate, molybdenum disulfide, graphite and bismuth in weight percent of total dry solids are 15, 34, 4 and 47, respectively.

5. A solid film lubricant composition comprising in weight percent dry solids, molybdenum disulfide 50, graphite 5, aluminum phosphate 20 and gold 25.

6. A solid film lubricant composition comprising in weight percent dry solids, molybdenum disulfide 34, graphite 4, aluminum phosphate 15 and bismuth 47.

References Cited
UNITED STATES PATENTS

| | | | |
|---|---|---|---|
| 2,214,104 | 9/1940 | Hildabolt et al. | 252—26 XR |
| 2,334,738 | 11/1943 | Wulff | 252—26 |
| 2,444,347 | 6/1948 | Greger et al. | 106—286 XR |
| 2,702,425 | 2/1955 | Thompson | 106—286 XR |
| 3,051,586 | 8/1962 | Heath et al. | 252—26 XR |
| 3,248,250 | 4/1966 | Collins | 106—286 |
| 3,248,251 | 4/1966 | Allen | 106—286 |

DANIEL E. WYMAN, *Primary Examiner.*

PATRICK P. GARVIN, *Examiner.*